(12) United States Patent
Weaver

(10) Patent No.: US 11,572,238 B2
(45) Date of Patent: Feb. 7, 2023

(54) AUTONOMOUS LOADING/UNLOADING OF CARGO

(71) Applicant: Oceaneering International, Inc., Houston, TX (US)

(72) Inventor: David Wesley Weaver, Severna Park, MD (US)

(73) Assignee: Oceaneering International, Inc., Houston, TX (US)

( * ) Notice: Subject to any disclaimer, the term of this patent is extended or adjusted under 35 U.S.C. 154(b) by 377 days.

(21) Appl. No.: 17/038,197

(22) Filed: Sep. 30, 2020

(65) Prior Publication Data

US 2021/0094771 A1    Apr. 1, 2021

Related U.S. Application Data

(60) Provisional application No. 62/908,710, filed on Oct. 1, 2019.

(51) Int. Cl.
*B64F 1/32* (2006.01)
*B65G 67/08* (2006.01)

(52) U.S. Cl.
CPC .............. *B65G 67/08* (2013.01); *B64F 1/322* (2020.01); *B65G 2201/0264* (2013.01)

(58) Field of Classification Search
None
See application file for complete search history.

(56) References Cited

U.S. PATENT DOCUMENTS

| 3,958,165 A * | 5/1976 | Boy de la Tour | B64F 1/322 244/137.1 |
| 4,218,034 A * | 8/1980 | Magill | B64F 1/00 244/114 R |

(Continued)

FOREIGN PATENT DOCUMENTS

| CN | 112585072 A * | 3/2021 | ......... B25J 15/0014 |
| DE | 10012090 A1 * | 9/2001 | ......... B25J 15/0014 |

*Primary Examiner* — Joseph A Dillon, Jr.
(74) *Attorney, Agent, or Firm* — Maze IP Law, P.C.

(57) ABSTRACT

Cargo may be optimally placed within a cargo hold using a cargo mover comprising a flexible conveyor belt extending from a ground location to a cargo hold, data defining a dimensional map of available space existing within the cargo hold for placement of cargo, a conveyor controller operatively in communication with the flexible conveyer belt and comprising packing software, and a smart loader comprising a predetermined set of scanning sensors operative to scan the cargo hold and a processor operatively in communication with the predetermined set of sensors and the conveyor controller. An interior of the cargo hold is scanned to create a dimensional map of the cargo hold and cargo placed onto the flexible conveyor belt where certain of each piece is cargo's physical dimensions are scanned. The processor compares the scanned cargo hold data set with the cargo's physical dimensions as well as with an order in which that piece of cargo will arrive at the smart loader to determine the placement of each piece of cargo. As each piece of cargo is placed into cargo hold, the smart loader continues to scan and update the dimensional map of the cargo hold to determine where each subsequent piece of cargo will be placed in the cargo hold.

19 Claims, 1 Drawing Sheet

(56) References Cited

U.S. PATENT DOCUMENTS

| | | | | |
|---|---|---|---|---|
| 5,143,194 A * | 9/1992 | Sang | ............ | B65G 43/08 198/810.01 |
| 6,893,200 B2 * | 5/2005 | Thøgersen | ............ | B65G 67/08 198/584 |
| 7,077,615 B2 * | 7/2006 | Thogersen | ............ | B64F 1/324 414/346 |
| 7,470,099 B2 * | 12/2008 | Bengtsson | ............ | B64F 1/324 414/346 |
| 7,513,354 B1 * | 4/2009 | Canapa | ............ | B64F 1/324 198/315 |
| 8,262,334 B2 * | 9/2012 | Christensen | ............ | B65G 41/002 198/581 |
| 9,174,805 B2 * | 11/2015 | Mallaghan | ............ | B65G 41/005 |
| 10,053,233 B2 * | 8/2018 | Jacobsen | ............ | B64F 1/324 |
| 10,556,761 B2 * | 2/2020 | Criswell | ............ | B65G 67/24 |
| 10,584,962 B2 * | 3/2020 | Ackley | ............ | G06Q 10/0832 |
| 10,669,108 B2 * | 6/2020 | Bell | ............ | B65G 21/14 |
| 10,843,882 B2 * | 11/2020 | Worsley | ............ | B65G 61/00 |
| 10,994,865 B2 * | 5/2021 | Daw Perez | ............ | B64F 1/32 |
| 11,142,342 B2 * | 10/2021 | Podnar | ............ | B64F 1/366 |
| 11,273,982 B2 * | 3/2022 | Haveman | ............ | G05D 1/0297 |
| 11,332,263 B2 * | 5/2022 | Clos | ............ | B65G 13/11 |
| 11,514,377 B2 * | 11/2022 | Abraham | ............ | G06Q 10/043 |
| 2002/0074456 A1 * | 6/2002 | Marrero | ............ | B64F 1/324 244/137.1 |
| 2006/0015396 A1 * | 1/2006 | Blomeyer | ............ | G06Q 90/00 705/13 |
| 2009/0105874 A1 * | 4/2009 | Tietjen | ............ | B64D 9/00 700/214 |
| 2010/0249989 A1 * | 9/2010 | Baldes | ............ | G06F 30/23 700/217 |
| 2011/0078182 A1 * | 3/2011 | Fenyes | ............ | G06Q 30/0645 707/770 |
| 2011/0313563 A1 * | 12/2011 | Huber | ............ | G06Q 10/08 700/214 |
| 2014/0205403 A1 * | 7/2014 | Criswell | ............ | B25J 15/0028 414/809 |
| 2017/0008643 A1 * | 1/2017 | Takeuchi | ............ | B64F 1/324 |
| 2017/0154127 A1 * | 6/2017 | Madmony | ............ | G06F 16/5854 |
| 2018/0111698 A1 * | 4/2018 | Podnar | ............ | G06Q 10/043 |
| 2018/0118476 A1 * | 5/2018 | Bastian, II | ............ | B65G 47/914 |
| 2020/0377317 A1 * | 12/2020 | Zoghzoghy | ............ | B65G 41/003 |
| 2020/0399069 A1 * | 12/2020 | Kirchner | ............ | B65G 17/20 |
| 2021/0086900 A1 * | 3/2021 | Christoffersson | ......... | B60P 1/38 |
| 2021/0122589 A1 * | 4/2021 | Griggs | ............ | B65G 67/02 |
| 2021/0179291 A1 * | 6/2021 | Daw Perez | ............ | B66F 7/065 |
| 2021/0284450 A1 * | 9/2021 | Wang | ............ | B64F 1/005 |
| 2021/0309354 A1 * | 10/2021 | Parker | ............ | B64C 3/56 |
| 2021/0323779 A1 * | 10/2021 | Sjostrom | ............ | B65G 67/00 |
| 2021/0371260 A1 * | 12/2021 | Chien | ............ | B66F 9/0755 |
| 2022/0063969 A1 * | 3/2022 | Marshall | ............ | B66F 9/07568 |
| 2022/0097243 A1 * | 3/2022 | Makhal | ............ | G06Q 10/087 |
| 2022/0194627 A1 * | 6/2022 | Morikami | ............ | B60P 1/649 |
| 2022/0219961 A1 * | 7/2022 | Keller | ............ | B66F 9/07 |

* cited by examiner

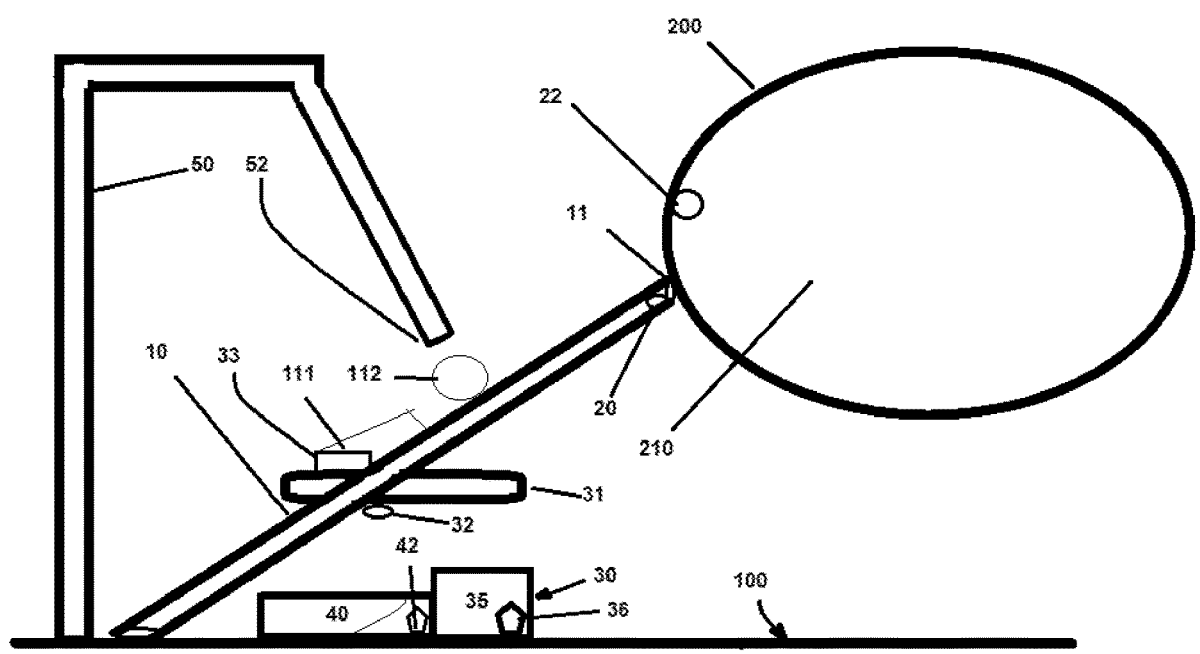

AUTONOMOUS LOADING/UNLOADING OF CARGO

RELATION TO OTHER APPLICATIONS

This application claims priority through U.S. Provisional Application 62/908,710 filed on Oct. 1, 2019.

BACKGROUND

Loading/unloading baggage or cargo from a cargo hold such as may be associated with an aircraft, e.g. a narrow-body jet aircraft, or other cargo carrier requires personnel to access the cargo hold of the plane to manually stack or retrieve the baggage/cargo. While conveyors are used to move cargo from the ground level into the cargo hold, personnel working inside the cargo hold must drag, lift and stack the baggage. This activity can result in injuries to ground support personnel due to the cramp space in which the work is conducted.

FIGURES

Various figures are included herein which illustrate aspects of embodiments of the disclosed inventions.

FIG. 1 is a block diagram of an exemplary embodiment of a cargo mover.

DESCRIPTION OF EXEMPLARY EMBODIMENTS

In a first embodiment, referring generally to FIG. 1, cargo mover 1 is usable for autonomous loading/unloading of baggage and/or other cargo into or out from a cargo hold, by way of example and not limitation such as into or out from narrow-body jet aircraft 200, and comprises flexible conveyor belt 10, comprising head end 11, configured to move luggage 111 and/or cargo 112 and/or the like or a combination thereof, generally referred to herein as "cargo," from ground location 100 up into cargo hold 210 and is sized to extend at least from ground location 100 to or into cargo hold 210; data defining dimensional map 114 (not shown in the figures) of available space existing within cargo hold 210 for placement of cargo; one or more sensors 20 located proximate head 11 of flexible conveyor belt 10; conveyor controller 40 operatively in communication with sensors 20 and further comprising packing software 42; and smart loader 30, comprising a set of scanning sensors 22, which are similar to sensors 20 and positioned and configured to scan cargo hold 210 and able return data representative of cargo hold 210, and processor 35.

Sensor 20 may comprise a camera, Lidar, or the like, or a combination thereof. In embodiments, sensor 20 further comprises a weight sensor and/or a physical dimensions sensor (x-axis, y-axis, and/or z-axis).

In embodiments, smart loader 30 further comprises rotating belt 31 disposed near a center of smart loader 30 or flexible conveyor belt 10, where rotating belt 31 is capable of high-speed movement to allow it to push a piece of cargo 111,112 into position off of or on to flexible conveyor belt 10. As used herein, "high-speed" means a speed at which rotating belt 31 can react in real time to allow it to push a piece of cargo 111,112 into position on flexible conveyor belt 10 without slowing down overall performance of cargo mover 1. In these embodiments, smart loader 30 may further comprise one or more electric actuators 32, typically located underneath rotating belt 31, to effectuate movement of rotating belt 31, including raising and/or lowering smart loader 30, and to operate side panels 33.

Processor 35 is operatively in communication with conveyor controller 40 and a predetermined set of sensors 20 and/or scanning sensors 22. Typically, processor 35 comprises a programmable computer or CPU and placement software 36 operative within processor 35 where placement software 36 is operative to determine placement of cargo 111,112 within cargo hold 210 and to create one or more control commands to be communicated to conveyor controller 40 to effectuate placement of cargo 111,112 within and/or removal of cargo 111,112 from cargo hold 210. Placement software 36 can comprise one or more static, dynamic, and/or heuristic algorithms useful to determine optimal use of space within cargo hold 210, including but not limited to self-learning and/or self-adaptive algorithms. Accordingly, processor 35 is operative to effectuate scanning of cargo hold 210 and determine how to stack cargo 111,112 on flexible conveyor belt 10 for placement into or out from cargo hold 210.

Packing software 42, either alone or in combination with placement software 36 associated with processor 35, is typically executable within conveyor controller 40 and is configured to create or help create a dense, efficient automated packing solution using sensors 20,22 which are used to measure physical dimensions (x-axis, y-axis, and/or z-axis) of each piece of cargo 111,112. Packing software 42 comprises one or more packing algorithms which can be static, dynamic, and/or heuristic, including but not limited to self-learning and/or self-adaptive algorithms.

In embodiments, cargo mover 1 further comprises one or more manipulator arms 50 configured to allow retrieval of cargo 111,112 onto or off of flexible conveyor 10 and/or rotating belt 31. In certain of these embodiments, manipulator arm 50 may further comprise one or more end effectors 52 which may operate using suction, mechanical couplings, or the like, or a combination thereof to engage cargo 111,112 such as by using suction or a mechanical coupling.

In the operation of exemplary methods, still referring to FIG. 1, unlike conventional conveyors inside a cargo hold, flexible conveyor belt 10 may be able to autonomously position itself and use one or more sensors 20 disposed proximate head 11 of flexible conveyor belt 10 and sensors 22 disposed within or proximate to cargo hold 210 to scan cargo hold 210 and determine how to stack cargo in cargo hold 210. Typically, the method uses dimensional map 114 created by scanning an interior of cargo hold 210 to create a scanned cargo hold data set.

Conveyor controller 40 and/or processor 35 may be used, either singly or cooperatively, to compare dimensional map 114 created from scanning and obtaining a predetermined set of sensed measurements obtained from sensors 20 and/or scanning sensors 22 about cargo hold 210 against the dimensional information obtained from sensors 20 about each piece of cargo as cargo 111,112 is placed on flexible conveyor belt 10, and further use sequencing information obtained from sensors 20 regarding the order in which each piece of cargo 111,112 will arrive at smart loader 30 to determine the placement of each piece of cargo 111,112 within cargo hold 210. This sequencing information typically comprises a sequencing identifier associated with each piece of cargo 111,112 and sensed measurements of each piece of cargo 111,112 and cargo hold 210. Typically, processor 35 alone is operative to effect scanning of cargo hold 210 and determine how to stack cargo 111,112 present on flexible conveyor belt 10 into cargo hold 210 and/or how to retrieve cargo 111,112 onto flexible conveyor belt 10 from cargo hold 210.

As each piece of cargo is placed in cargo hold 210, smart loader 30, e.g. via processor 35, continues to scan and update dimensional map 114 of cargo hold 210 to determine where each subsequent piece of cargo 111,112 will be placed into and/or removed from cargo hold 210. As cargo 111,112 is placed on flexible conveyor belt 10, the physical dimensions in two or three dimensions of cargo 111,112 is scanned by one or more sensors 20. The scanning results in a set of dimensional information as well as a sequence of each piece of cargo 111,112 which is forwarded to smart loader 30.

Software, including placement software 36 and packing software 42, typically utilizes one or more packing theories as reflected in algorithms, as are familiar to those of ordinary skill in software-based packing algorithms, for optimal placement of cargo 111,112 in cargo hold 210. The algorithm or algorithms used by the software continuously analyze current available space in cargo hold 210, typically in three dimensions, and, based on currently scanned cargo 111,112, runs multiple iterations of possible placement options to determine optimal placement. In embodiments, these one or more algorithms are architected to become more efficient with denser loading on flexible conveyor belt 10. By way of example and not limitation, the one or more algorithms may use machine learning to improve placement into cargo hold 210 with the input of size of each piece of cargo 111,112 and a probability of various sizes of each piece of cargo 111,112 yet to be received and enable, through prediction, further increased packaging density within cargo hold 210. In part, this can include continuing to scan and update the scanned cargo hold data set during operation and using the updated scanned cargo hold data set to determine where each subsequent piece of cargo will be stacked as each piece of cargo is placed in cargo hold 210.

In embodiments where sensor 20 comprises a weight sensor, the weight of each piece of cargo 111,112 may also be obtained when each such piece of cargo 111,112 is loaded onto flexible conveyor belt 110 and/or into cargo hold 210 and the one or more algorithms can use that weight to provide greater accurate weight distribution inside cargo hold 210.

Smart loader 30, using conveyor controller 40, may control the speed of flexible conveyor belt 10 to allow positioning of smart loader 30 prior to placing the next piece of cargo 111,112.

If rotating belt 31 is present, cargo mover 1, via conveyor controller 40, may raise and/or lower smart loader 30 using electric actuators 32. This ability to change elevation may be used to allow smart loader 30 to place or otherwise position cargo 111,112 as the stack height increases. In certain of these embodiments, smart loader 30 may further use electric actuators 32 to operate side panels 33 to enable smart loader 30 to clamp and hold cargo and rotate greater than 90 degrees to place cargo on its side in the stack. Typically, as one row of cargo 111,112 has been stacked, smart loader 30 uses electric actuators and/or rotating belt 31 to reposition itself to start the next stack of cargo 111,112.

If manipulator arm 50 is present, smart loader 30 may also use sensors 20,22 to aid in positioning manipulator arm 50 to retrieve a piece of cargo 111,112. In these embodiments, manipulator arm 50 typically uses one or more sensors 20,22 to aid in locating the best spot to attach manipulator arm 50 to cargo 111,112, e.g. using end effectors 52. As manipulator arm 50 pulls cargo 111,112 forward, rotating belt 31 may be activated to assist in removing cargo 111,112 from flexible conveyor belt 110. Once on rotating belt 31, manipulator arm 50 is typically detached from the piece cargo and that piece of cargo then moved down flexible conveyor belt 10 to ground location 100. This operation may be repeated until all cargo 111,112 are removed.

In certain embodiments, system monitoring may be provided to ensure cargo mover schedules are not impacted, e.g. cargo movers such as airlines. In these embodiments, sensor 20 may comprise a camera whose output may be viewed remotely and which may be used to monitor loading/unloading operations and allow human intervention if required.

Additionally, one or more alarms may be sent to a predetermined location, e.g. a remote location, if cargo mover 1 exceeds established parameters during operation or a shutdown occurs due to a component failure. In certain embodiments, a sensed measurement may be sensed or otherwise determined to have exceeded an established parameter during operation, such as by using one or more sensors 20,22 in conjunction with processor 35 and/or controller 40. Similarly, one or more sensors 20,22 in conjunction with processor 35 and/or controller 40 may determine that a shutdown has occurred due to a component failure. In these situations, processor 35 and/or controller 40 may send an alarm regarding the exceeding or shutdown to a predetermined location such as via data communicator 11.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A cargo mover, comprising:
    a. a flexible conveyor belt, sized to extend from a ground location to a cargo hold;
    b. data defining a dimensional map of available space existing within the cargo hold for placement of cargo;
    c. a predetermined set of sensors disposed proximate a head end of the flexible conveyor belt;
    d. a conveyor controller operatively in communication with the flexible conveyor belt and comprising packing software executable within the conveyor controller, the conveyor controller operatively in communication with the predetermined set of sensors;
    e. a smart loader at least partially disposed at a predetermined end of the flexible conveyor belt, the smart loader comprising:
        i. a predetermined set of scanning sensors disposed proximate to and operative to scan the cargo hold and return data representative of physical space within the cargo hold;
        ii. a processor operatively in communication with the predetermined set of scanning sensors and the conveyor controller; and
        iii. placement software operative within the processor, the placement software operative to determine placement of cargo within the cargo hold and to create and communicate a control command to the conveyor controller to effect placement of cargo within or removal of cargo from the cargo hold.

2. The cargo mover of claim 1, wherein the processor is operative to effect scanning of the cargo hold and determine how to stack cargo on the flexible conveyor belt into the cargo hold and/or out from the cargo hold.

3. The cargo mover of claim 1, wherein the cargo hold is part of an aircraft.

4. The cargo mover of claim 1, wherein at least one of the predetermined set of sensors comprises a weight sensor.

5. The cargo mover of claim 1, wherein the smart loader further comprises a rotating belt disposed near a center of the flexible conveyor belt, the rotating belt configured for high-speed movement to allow it to push a piece of cargo into a position on a stack.

6. The cargo mover of claim 5, wherein the smart loader further comprises an electric actuator located underneath the rotating belt and operatively connected to the rotating belt.

7. The cargo mover of claim 1, further comprising a manipulator arm configured to allow retrieval and movement of cargo relative to the flexible conveyor belt.

8. The cargo mover of claim 7, wherein the manipulator arm further comprises an end effector disposed at an end of the manipulator arm, the end effector operative to engage a piece of cargo.

9. The cargo mover of claim 8, wherein the end effector is operative to engage a piece of cargo using suction or a mechanical coupling.

10. The cargo mover of claim 1, wherein the placement software comprises an algorithm for placement of cargo within the cargo hold which optimally uses space within the cargo hold.

11. A method of placement of cargo within a cargo hold using a cargo mover comprising a flexible conveyor belt sized to extend from a ground location to the cargo hold, data defining a dimensional map of available space existing within the cargo hold for placement of cargo, a conveyor controller operatively in communication with the flexible conveyer belt and comprising packing software where a predetermined set of sensors is disposed proximate a head end of the flexible conveyor belt, and a smart loader disposed at a predetermined end of the flexible conveyer belt where the smart loader comprises a predetermined set of scanning sensors operative to scan the cargo hold and a processor operatively in communication with the predetermined set of sensors and the conveyor controller and placement software operative within the processor where the placement software is operative to determine placement of cargo within the cargo hold and to create and communicate a control command to the conveyor controller to effect placement of cargo within or removal of cargo from the cargo hold, the method comprising:
  a. placing cargo onto the flexible conveyor belt;
  b. scanning an interior of the cargo hold to create a dimensional map of the cargo hold, the dimensional map defining a scanned cargo hold data set;
  c. as a piece of cargo is placed on the flexible conveyor belt, using one or more sensors to scan each piece of cargo and sense a predetermined set of measurements of the scanned piece of cargo;
  d. providing the predetermined set of sensed measurements to the processor;
  e. providing a sequence identifier for each piece of cargo to the processor, the sequence identifier associated with the predetermined set of sensed measurements;
  f. using the processor to compare the scanned cargo hold data set with the predetermined set of measurements as well as with an order in which each piece of cargo will arrive at the smart loader to determine the placement of each piece of cargo, the placement process comprising using the placement software and/or the packing software, which comprises a packing algorithm, to determine an optimal cargo placement within the cargo hold for each piece of scanned cargo;
  g. placing the scanned cargo in the optimal cargo hold placement; and
  h. as each piece of cargo is placed into cargo hold, using the smart loader to continue to scan and update the dimensional map of the cargo hold to determine where each subsequent piece of cargo will be placed in the cargo hold.

12. The method of claim 11, further comprising:
  a. continuing to scan each piece of cargo and update the scanned cargo hold data set during operation; and
  b. using the updated scanned cargo hold data set to determine where each subsequent piece of cargo will be placed in the cargo hold as each piece of cargo is placed in the cargo hold.

13. The method of claim 11, wherein the predetermined set of measurements comprises physical dimensions of each piece of cargo.

14. The method of claim 11, wherein the placement software further comprises a machine learning module operative to modify a placement algorithm to improve the placement algorithm with the input of cargo size and/or probability of various cargo sizes to be received and to use a prediction based on the modified placement algorithm to further increased packaging density within the cargo hold.

15. The method of claim 11, wherein the sensor comprises a camera located on the smart loader, the method further comprising using the camera to provide a video output to a remote location to allow monitoring of loading/unloading operations and allow intervention if required.

16. The method of claim 11, wherein the cargo mover comprises a manipulator arm, the method further comprising:
  a. using the sensor and/or the scanning sensor to aid in positioning the manipulator arm proximate a piece of cargo; and
  b. using the positioned manipulator arm to retrieve the piece of cargo.

17. The method of claim 16, where the manipulator arm uses the sensor and/or the scanning sensor to aid in locating a best spot to attach to the piece of cargo.

18. The method of claim 16, further comprising:
  a. using the manipulator arm to pull the piece of cargo forward;
  b. as the manipulator arm pulls the piece of cargo forward, activating a rotating belt to assist in removing the piece of cargo from the flexible conveyer belt;
  c. placing the removed piece of cargo onto the rotating belt; and
  d. once the remove piece of cargo is on the rotating belt, detaching the manipulator arm from the removed piece of cargo.

19. The method of claim 11, further comprising:
  a. determining if a sensed measurement of the predetermined set of sensed measurements exceeds an established parameter during operation or if a shutdown occurs due to a component failure; and
  b. sending an alarm regarding the exceeding or shutdown to a predetermined location.

* * * * *